United States Patent [19]

Nebelung

[11] Patent Number: 4,770,686
[45] Date of Patent: Sep. 13, 1988

[54] SUPPORT FOR SUPPORTING AN OPERATING MECHANISM OF A GLASSWARE FORMING MACHINE

[75] Inventor: Hermann H. Nebelung, Winsen, Fed. Rep. of Germany

[73] Assignee: Emhart Industries, Inc., Farmington, Conn.

[21] Appl. No.: 93,346

[22] Filed: Sep. 4, 1987

[30] Foreign Application Priority Data

Sep. 9, 1986 [GB] United Kingdom ............... 8621682

[51] Int. Cl.⁴ ............................................. C03B 9/14
[52] U.S. Cl. ..................................... 65/171; 65/172; 65/260; 65/261
[58] Field of Search ................ 65/171, 172, 173, 260, 65/261

[56] References Cited

U.S. PATENT DOCUMENTS

| | | | |
|---|---|---|---|
| 1,291,952 | 1/1919 | Lorenz | 65/173 X |
| 2,464,335 | 3/1949 | McNamara et al. | 65/171 X |
| 4,004,905 | 1/1977 | Mumford | 65/261 X |
| 4,388,096 | 6/1983 | Boschi | 65/171 X |

Primary Examiner—Arthur Kellogg
Attorney, Agent, or Firm—Spencer T. Smith

[57] ABSTRACT

A support for an operating mechanism such as a takeout mechanism (10) of a glassware forming machine comprises a slideway (34) extending vertically above an operating position of the mechanism at a blow station of the machine, a carriage (40) mounted for vertical adjustment on the slideway, a seat (50) for the mechanism operating mechanism, and clamping means (62, 64, 70) operable to hold the operating mechanism in the seat. The seat (50) is in vertical alignment with the operating position.

6 Claims, 1 Drawing Sheet

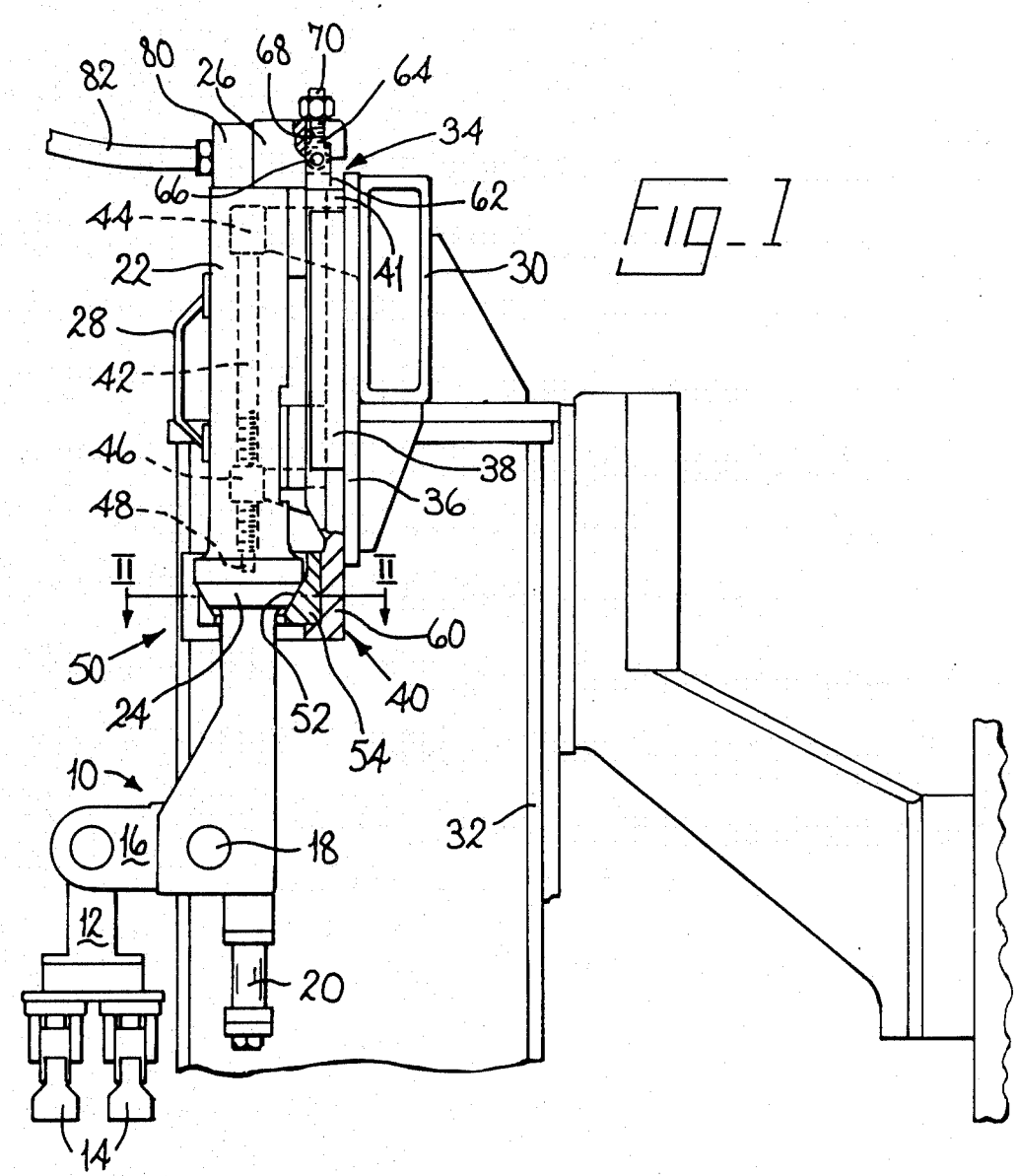
Fig_1
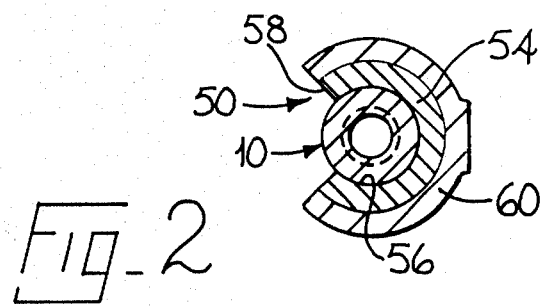
Fig_2

SUPPORT FOR SUPPORTING AN OPERATING MECHANISM OF A GLASSWARE FORMING MACHINE

BACKGROUND OF THE INVENTION

This invention is concerned with a support for supporting an operating mechanism of a glassware forming machine. Specifically, the invention is concerned with a support for supporting an operating mechanism such as a blowhead mechanism or a take-out mechanism at a blow station of a section of a glassware forming machine of the individual section type.

Glassware forming machines of the individual section type are well-known and comprise a plurality of independently-operating glassware forming sections each of which comprises mechanisms operable to form a gob of molten glass into a completed article of glassware. The sections of a machine are arranged in a line and receive gobs from a common source in a predetermined sequence, operate with appropriate phase differences from one another, and deliver their output to a common conveyor.

Each section of a glassware forming machine of the individual section type comprises a supporting frame which supports operating mechanisms at a parison-forming or blank station of the section at which gobs are formed into parisons and also at a blow or finish station at which the parisons are blown into complete articles of glassware. The operating mechanisms at the blow station comprise a blowhead mechanism operable to move a blowhead on to a parison in a mould cavity so that air blown through the blowhead causes the parison to expand to the shape of the mould cavity. The blowhead mechanism then removes the blowhead to allow removal of the article. The article is removed by a further operating mechanism at the blow station which is called a take-out mechanism. The take-out mechanism moves tongs to a completed article, causes the tongs to grip a neck portion of the article, moves the tongs and the article away from the mould to a deadplate of the section, and causes the tongs to open releasing the article on to the deadplate.

In a conventional machine of the individual section type, the blowhead and take-out mechanisms are mounted on the end of the support frame side by side and project upwardly to above the mould or moulds at the blow station so that the blowhead and tongs are supported above the mould level. The takeout mechanism is supported for vertical adjustment on a slideway formed by two rails mounted on the supporting frame.

In the operation of a glassware forming machine of the individual section type, it is necessary from time-to-time to remove the blowhead and/or take-out mechanism and replace it. This is done when a mechanism malfunctions so that the section can continue in production without awaiting repair of the mechanism. In conventional machines the removal and replacement of such mechanisms is a difficult and time-consuming task which must be carried out in the vicinity of hot glass articles produced by the remaining sections of the machine. The task requires the removal of pipework and its replacement after a replacement mechanism has been inserted on the slideway. This task is rendered difficult by the presence of the conveyor passing the face of the supporting frame on which the mechanisms are mounted and by the close proximity in which the mechanisms are mounted.

It is an object of the present invention to provide a support for supporting an operation at a blow station of a section of a glassware forming machine of the individual section type which support enables mechanisms to be removed and replaced more rapidly than in conventional machines.

BRIEF DESCRIPTION OF THE INVENTION

The invention provides a support for supporting an operating mechanism at a blow station of a section of a glassware forming machine of the individual section type, the support comprising a slideway extending vertically above a desired operating position of the operating mechanism at the blow station, a carriage mounted for vertical movement on the slideway, adjusting means operable to bring the carriage to a particular height on the slideway, a seat for the operating mechanism supported by the carriage, the seat being arranged to receive the operating mechanism and support it in vertical alignment with its operation position, and clamping means operable to hold the operating mechanism in the seat.

With a support according to the last preceding paragraph, the slideway is above the operating mechanism instead of below as in conventional machines and hence is more accessible as the conveyor associated with the machine does not restrict access. Furthermore, when a mechanism is to be removed and replaced, it is only necessary to release the clamping means, disconnect the pipework, lift the mechanism to be replaced from its seat, place the replacement mechanism on the seat, fasten the clamping means and reconnect the pipework. The proximity of adjacent mechanisms does not significantly restrict this operation and, as the seat has already been adjusted to the correct height, no height adjustment is required for the replacement mechanism which is in contrast to conventional practice.

Preferably, the seat defines a recess in which the operating mechanism is received, the recess being bounded by an arcuate downwardly-tapering surface arranged to engage a complementarily-shaped surface of the operating mechanism. The downwardly-tapering surface of the recess serves to guide a mechanism to its correct operating position in a horizontal plane.

Preferably, the seat is horseshoe-shaped in horizontal cross-section so that it defines an opening through which a portion of the operating mechanism can be introduced and the mechanism can then be lowered into engagement with the seat.

Preferably, the clamping means of the support comprises an upward projection of the carriage arranged so that a hook-portion of the operating mechanism can be received over the projection, a bolt member mounted in a recess in the projection for pivotal movement in a vertical plane into or out of a recess in the hook-portion of an operating mechanism received over the projection, and a nut threadedly-received on the bolt member and arranged to be tightened, when the bolt member is in the recess in the hook-portion of an operating mechanism, to prevent removal of the hook-portion from the projection of the carriage. This type of clamping means is simple and easy to operate and has the advantage that the orientations of the projection and hook portion can be arranged to ensure that the mechanism is supported in the correct orientation about a vertical axis.

Preferably, the slideway is supported by a beam extending horizontally above the blow stations of all the sections of the machine transversely of the sections, the beam supporting slideways of similar supporting apparatuses at all the sections for supporting take-out and blowhead mechanisms. This provides a simple way of providing supports for blowhead and take-out mechanisms at all the sections of a machine.

The invention also provides in a glassware forming machine of the individual section type, a support for supporting an operating mechanism at a blow station of a section of the machine, and an operating mechanism supported by the support, the support comprising a slideway extending vertically above a desired operating position of the operating mechanism at the blow station, a carriage mounted for vertical movement on the slideway, adjusting means operable to bring the carriage to a particular height on the slideway, a seat for the operating mechanism supported by the carriage and comprising an arcuate downwardly-tapering surface, the seat being arranged to receive the operating mechanism and support it in vertical alignment with its operating position, and clamping means operable to hold the operating mechanism in the seat, and the operating mechanism comprising a frusto-conical surface of complementary shape to the surface of the seat and arranged to engage the surface of the seat when the mechanism is received in the seat, and a hook portion arranged to hook over an upward projection of the support to thereby orientate the operating mechanism in a horizontal plane with respect to the support.

BRIEF DESCRIPTION OF THE DRAWINGS

There now follows a detailed description, to be read with reference to the accompanying drawings, of a support for supporting an operating mechanism which is illustrative of the invention. It is to be understood that the illustrative support has been selected for description by way of example and not of limitation of the invention.

In the drawings:

FIG. 1 is a side elevational view, partly in section, of the illustrative support; and FIG. 2 is a cross-sectional view taken on the line II—II in FIG. 1.

DETAILED DESCRIPTION OF PREFERRED EMBODIMENT OF THE INVENTION

The illustrative support is for supporting an operating mechanism, specifically a take-out mechanism 10 although it could equally well support a blowhead mechanism, at a blow station of a section of a glassware forming machine of the individual section type.

The take-out mechanism 10 comprises a tong support 12 on which two sets of tongs 14 are mounted so that two articles can be taken out at a time. The tong support 12 is pivotally mounted on an arm 16 of the mechanism 10 which is movable, in conventional manner, through 180° about an axis 10 to move the tongs 14 between a position in which they can grip articles in mould cavities at the blow station and a position at which they can release the articles on to a deadplate of the section. Conventional means (not shown) are provided on the arm 16 to maintain the vertical alignment of the tongs 14 as the arm 16 moves about the axis 18.

The take-out mechanism 10 also comprises means for turning the arm 16 about the axis 18 as aforementioned. This means comprises a gear (not shown) mounted on the arm 16 and turnable about the axis 18, a rack (not shown but contained in a housing 20) meshed with the gear and a piston and cylinder assembly 22 operable to move the rack vertically to turn the gear and hence the arm 16 about the axis 18. The structure of the take-out mechanism 10 described thus far is conventional but the mechanism 10 differs from the conventional in that it has its piston and cylinder assembly located above rather than below the axis 18, in that a frusto-conical surface 24 tapering downwardly is formed on the outer surface of the cylinder of the assembly 22, in that a hook portion 26 projects upwardly from the top of the cylinder of the assembly, and in that a handle 28 is mounted on the side of said cylinder.

The illustrative support is mounted on a beam 30 which extends horizontally above the blow stations of all the sections of the machine transversely of the sections. The beam 30 is not present in conventional machines but is supported by vertical supporting frame members 32 which are.

The illustrative support comprises a slideway 34 extending vertically above a desired operating position of the operating mechanism supported thereby at the blow station. In the case of the take-out mechanism 10, the desired operating position is that which enables the tongs 14 to grip and release articles at the correct positions. In the case of a blowhead mechanism, which comprises a piston and cylinder assembly arranged to move blowheads vertically and a cam arrangement which moves the blowheads into or out of alignment with the mould cavities as the blowheads are moved vertically, the desired operating position is such that operation of the piston and cylinder assembly brings the blowheads correctly on to the moulds.

The slideway 34 comprises a vertically-extending plate 36 mounted on the beam 30 and two opposed rails 38 (only one visible in FIG. 1). The rails 38 are mounted on the plate 36 and have opposed vertically-extending slots (not shown) in which a carriage 40 of the illustrative support is mounted for vertical movement on the slideway 34. A plate portion 41 of the carriage 40 being received in the slots of the rails 38.

The illustrative support also comprises adjusting means operable to bring the carriage 40 to a particular height on the slideway 34. The adjusting means comprises a vertically-extending screw-threaded rod 42 which is mounted to turn about a vertical axis but not for vertical movement on a bracket 44 which projects from the beam 30. The rod 42 is threadedly-received in a block 46 of the carriage 40 so that, when the rod 42 is turned by application of a spanner to a square end portion 48 of the rod, the carriage 40 is moved vertically on the slideway 34.

The illustrative support also comprises a seat 50 for the take-out mechanism 10 supported by the carriage 40, the seat 50 being arranged to receive the take-out mechanism 10 and support it in vertical alignment with its operating position. The seat 50 comprises an arcuate downwardly-tapering surface 52 of a seat member 54 which is horse=shaped in horizontal cross-section (see FIG. 2). The surface 52 defines a recess 56 in which the take-out mechanism 10 is received and is arranged to engage the surface 24 of the mechanism 10 which is of complementary shape, since the surface 52 is horseshoe-shaped, it defines an opening 58 through which a portion of the mechanism 10 below the surface 24 can be introduced and the mechanism can then be lowered into engagement with the surface 52 of the seat 50. The seat member 54 is mounted on a horseshoe-shaped portion 60 of the carriage 40 which is integral with and projects horizontally away from the plate portion 41 of the carriage 40.

The illustrative support also comprises clamping means operable to hold the take-out mechanism 10 in the seat 50. The clamping means comprises an upward projection 62 of the portion 41 of the carriage 40 arranged so that the hook-portion 26 of the mechanism 10 can be received over the projection. The clamping means also comprises a bolt member 64 mounted in a recess in the projection 62 for pivotal movement in a vertical plane about a horizontal shaft 66 supported by the projection 62 and extending through an eye of the bolt member 64.

The bolt member 64 is pivotal into and out of a slot 68 in the hook-portion 26 received over the projection 62. A nut 70 is threadedly-received on the bolt member 64 and is arranged to be tightened, when the bolt member 64 is in the slot 68 to engage the top of the hook-portion 26 and prevent removal of the hook-portion 26 from the projection 62.

In order to supply the operating oil and air to the mechanism, a detachable kissplate 80 is mounted on the upper surface of the assembly 22 and forms a connection between passages in the assembly (not shown) and external pipework 82.

In order to remove the mechanism 10 and replace it, the nut 70 is loosened until the bolt member 64 can be pivoted out of the recess 68 (clockwise viewing FIG. 1). Then, using the handle 28 the mechanism 10 is lifted until the hook-portion 26 is clear of the projection 62 and the surface 24 is clear of the seat member 54. Then the mechanism 10 can be removed through the opening 58. The new mechanism 10 is then raised using its handle 28 until it can enter the opening 58 with its surface 24 above the surface 52 and its hook-portion 26 above the projection 62. The mechanism is then lowered until the surface 24 engages the surface 52 and the portion 26 hooks over the projection 62. The engagement of the portion 26 and the projection 62 ensures that the mechanism is in its correct orientation about a vertical axis and prevents the mechanism from tilting. The surface 52 centres the mechanism and ensures that is reaches the correct height. Finally, the bolt member 64 is pivoted into the recess 68 and the nut 70 tightened.

I claim:

1. A support for supporting an operating mechanism at a blow station of a section of a glassware forming machine of the individual section type, the support comprising a slideway extending vertically above a desired operating position of the operating mechanism at the blow station, a carriage mounted for vertical movement on the slideway, adjusting means operable to bring the carriage to a particular height on the slideway, a seat for the operating mechanism supported by the carriage, the seat being arranged to receive the operating mechanism and support it in vertical alignment with its operating position, and clamping means operable to hold the operating mechanism in the seat.

2. A support according to claim 1, wherein the seat defines a recess in which the operating mechanism is received, the recess being bounded by an arcuate downwardly-tapering surface arranged to engage a complementarily-shaped surface of the operating mechanism.

3. A support according to claim 1, wherein the seat is horseshoe-shaped in horizontal cross-section so that it defines an opening through which a portion of the operating mechanism can be introduced and the mechanism can then be lowered into engagement with the seat.

4. A support according to claim 1, wherein the clamping means comprises an upward projection of the carriage arranged so that a hook-portion of the operating mechanism can be received over the projection, a bolt member mounted in a recess in the projection for pivotal movement in a vertical plane into or out of a recess in the hook-portion of an operating mechanism received over the projection, and a nut threadedly-received on the bolt member and arranged to be tighten, when the bolt member is in the recess in the hook-portion of an operating mechanism, to prevent removal of the hook-portion from the projection of the carriage.

5. A support according to claim 1, wherein the slideway is supported by a beam extending horizontally above the blow stations of all the sections of the machine transversely of the sections, the beam supporting slideways of similar supporting apparatuses at all the sections for supporting take-out and blowhead mechanisms.

6. In a glassware forming machine of the individual section type, a support for supporting an operating mechanism at a blow station of a section of the machine, and an operating mechanism supported by the support, the support comprising a slideway extending vertically above a desired operating position of the operating mechanism at the blow station, a carriage mounted for vertical movement on the slideway, adjusting means operable to bring the carriage to a particular height on the slideway, a seat for the operating mechanism supported by the carriage and comprising an arcuate downwardly-tapering surface, the seat being arranged to receive the operating mechanism and support it in vertical alignment with its operating position, and clamping means operable to hold the operating mechanism in the seat, and the operating mechanism comprising a frusto-conical surface of complementary shape to the surface of the seat and arranged to engage the surface of the seat when the mechanism is received in the seat, and a hook portion arranged to hook over an upward projection of the support to thereby orientate the operating mechanism in a horizontal plane with respect to the support.

* * * * *